(12) United States Patent
Liang et al.

(10) Patent No.: US 11,420,875 B2
(45) Date of Patent: Aug. 23, 2022

(54) NEGATIVE ACTIVE MATERIAL, PREPARATION METHOD THEREOF, AND RELATED SECONDARY BATTERY, BATTERY MODULE, BATTERY PACK AND APPARATUS

(71) Applicant: Contemporary Amperex Technology Co., Limited, Ningde (CN)

(72) Inventors: Chengdu Liang, Ningde (CN); Yuzhen Zhao, Ningde (CN); Yingjie Guan, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/586,725

(22) Filed: Jan. 27, 2022

(65) Prior Publication Data

US 2022/0153598 A1 May 19, 2022

Related U.S. Application Data

(63) Continuation of application No. PCT/CN2020/103346, filed on Jul. 21, 2020.

(30) Foreign Application Priority Data

Jul. 29, 2019 (CN) .......................... 201910688516.2

(51) Int. Cl.
*C01B 33/18* (2006.01)
*C09C 1/30* (2006.01)

(52) U.S. Cl.
CPC ............ *C01B 33/18* (2013.01); *C09C 1/3072* (2013.01); *C01P 2002/72* (2013.01);
(Continued)

(58) Field of Classification Search
None
See application file for complete search history.

(56) References Cited

U.S. PATENT DOCUMENTS

2015/0064552 A1* 3/2015 Huang ................ H01M 4/0419
429/212
2019/0074508 A1 3/2019 Ha et al.

FOREIGN PATENT DOCUMENTS

CN 101210119 A 7/2008
CN 102160217 A 8/2011
(Continued)

OTHER PUBLICATIONS

The International search report for PCT Application No. PCT/CN2020/103346, dated Oct. 23, 2020, 16 pages.
(Continued)

*Primary Examiner* — Daniel S Gatewood
(74) *Attorney, Agent, or Firm* — Law Offices of Liaoteng Wang

(57) ABSTRACT

This application belongs to the field of energy storage technology, and specifically discloses a negative active material including $SiO_x$ particles and a modified polymer coating layer covering the $SiO_x$ particles, in which $0<x<2$; wherein the negative active material has a peak intensity $I_1$ at the Raman shift ranging from 280 $cm^{-1}$ to 345 $cm^{-1}$, a peak intensity $I2$ at the Raman shift ranging from 450 $cm^{-1}$ to 530 $cm^{-1}$, and a peak intensity $I3$ at the Raman shift ranging from 900 $cm^{-1}$ to 960 $cm^{-1}$, and $I_1$, $I_2$ and $I_3$ satisfy $0.1 \leq I_1/I_2 \leq 0.6$, and $0.2 \leq I_3/I_2 \leq 1.0$. This application also discloses a method for preparing a negative active material and related secondary batteries, battery modules, battery packs and apparatus.

20 Claims, 3 Drawing Sheets

(52) U.S. Cl.
CPC ...... *C01P 2002/74* (2013.01); *C01P 2002/82* (2013.01); *C01P 2004/51* (2013.01)

(56) References Cited

FOREIGN PATENT DOCUMENTS

| | | | |
|---|---|---|---|
| CN | 104334613 A | | 2/2015 |
| CN | 105633368 A | | 6/2016 |
| CN | 106025219 A | | 10/2016 |
| CN | 109103441 A | * | 12/2018 ........ H01M 10/0525 |
| CN | 109103441 A | | 12/2018 |
| JP | 2004155938 A | | 6/2004 |
| JP | 2009140876 A | | 6/2009 |
| JP | 2013089337 A | | 5/2013 |
| JP | 2018503962 A | | 2/2018 |
| JP | 2019091792 A | | 6/2019 |
| KR | 20130117953 A | | 10/2013 |

OTHER PUBLICATIONS

The First Office Action for China Application No. 201910688516.2, dated Jul. 1, 2021, 8 pages.

Lu Shi et al. High-safety lithium-ion sulfur battery with sulfurized polyacrylonitrile cathode, prelithiated SiOx/C anode and carbonate-based electrolyte. Journal of Alloys and Compounds, vol. 723, p. 974-982, dated Jul. 1, 2017.

GBT 19587-2004, Determination of the specific surface area of solids by gas adsorption using the BET method published Sep. 29, 2004, implemented Apr. 1, 2005, 15 pages.

GBT 20123-2006, Steel and iron—Determination of total carbon and sulfur content Infrared absorption method after combustion in an induction furnace(routine method), published Mar. 2, 2006, implemented Sep. 1, 2006, 26 pages.

GBT 24533-2009, Graphite negative electrode materials for lithium ion battery, published Oct. 30, 2009, implemented May 1, 2010, 63 pages.

JIS K0131-1996, General rules for X-ray diffractometric analysis, 30 pages.

JJG 395-1997, Verification Regulation for Carbon-Sultur Analyzer, authorized Sep. 1, 1997, implemented Mar. 1, 1998, 9 pages.

The extended European search report dated May 13, 2022 for European Application No. 20847834.7, 6 pages.

The First Office Action dated Apr. 12, 2022 for Indian Application No. 202117056760, 5 pages.

The First Office Action for Japanese Application No. 2021-554377, dated Jul. 5, 2022, 13 pages.

* cited by examiner

NEGATIVE ACTIVE MATERIAL, PREPARATION METHOD THEREOF, AND RELATED SECONDARY BATTERY, BATTERY MODULE, BATTERY PACK AND APPARATUS

CROSS-REFERENCE TO RELATED APPLICATION

This application is a continuation of International Application No. PCT/CN2020/103346, filed on Jul. 21, 2020, which claims priority to Chinese Patent Application No. 201910688516.2 entitled "Negative Active Material and Secondary Battery" and filed on Jul. 29, 2019, both of which are incorporated herein by reference in their entireties.

TECHNICAL FIELD

This application belongs to the technical field of energy storage, and specifically relates to a negative active material, preparation method thereof, and further relates to a secondary battery and battery module, battery pack and apparatus.

BACKGROUND

With the increasing attention to environmental protection, environmentally friendly secondary batteries are gradually being applied to electric vehicles. Different from secondary batteries used in consumer electronics, power secondary batteries have higher requirements for energy density and cycle life. Compared with traditional carbon materials, silicon-oxygen materials have a high theoretical gram capacity as negative active materials, which is several times greater than that of graphite-based negative active materials. Therefore, the industry expects to use silicon-oxygen materials to increase the energy density of secondary batteries.

However, the cycle life of the silicon-oxygen material is poor, resulting in poor cycle performance of the secondary battery. Therefore, there is an urgent need to develop a new negative active material so that the secondary battery has both long-cycle performance and high energy density.

SUMMARY

In a first aspect of the present application, a negative active material is provided, including $SiO_x$ particles and a modified polymer coating layer covering the $SiO_x$ particles, in which $0<x<2$; the negative active material has a Raman spectrum comprising peaks at the Raman shifts of 280 cm$^{-1}$~345 cm$^{-1}$, 450 cm$^{-1}$~530 cm$^{-1}$ and 900 cm$^{-1}$~960 cm$^{-1}$, in which the peak at the Raman shifts of 280 cm$^{-1}$~345 cm$^{-1}$ has a peak intensity recorded as $I_1$, the peak at the Raman shifts of 450 cm$^{-1}$~530 cm$^{-1}$ has a peak intensity recorded as $I_2$, and the peak at the Raman shifts of 900 cm$^{-1}$~960 cm$^{-1}$ has a peak intensity recorded as $I_3$, and $I_1$, $I_2$ and $I_3$ satisfy $0.1<I_1/I_2\leq0.6$, $0.2\leq I_3/I_2\leq1.0$.

The negative active material of this application includes $SiO_x$ ($0<x<2$) and a modified polymer coating layer coated on at least a part of the outer surface of SiOx ($0<x<2$), the negative active material has a Raman spectrum comprising peaks at the Raman shifts of 280 cm$^{-1}$~345 cm$^{-1}$, 450 cm$^{-1}$~530 cm$^{-1}$ and 900 cm$^{-1}$~960 cm$^{-1}$, in which the peak at the Raman shifts of 280 cm$^{-1}$~345 cm$^{-1}$ has a peak intensity recorded as $I_1$, the peak at the Raman shifts of 450 cm$^{-1}$~530 cm$^{-1}$ has a peak intensity recorded as 12, and the peak at the Raman shifts of 900 cm$^{-1}$~960 cm$^{-1}$ has a peak intensity recorded as $I_3$, and $I_1$, $I_2$ and $I_3$ satisfy $0.1\leq I_1/I_2\leq0.6$, $0.2\leq I_3/I_2\leq1.0$, making the modified polymer coating layer has higher toughness and higher ion conductivity, thus the cycle coulombic efficiency of the material is improved, so that the initial coulombic efficiency and cycle performance of the secondary battery are greatly improved. Therefore, the initial coulombic efficiency and cycle performance of the secondary battery using the negative active material of the present application are improved, and the energy density is increased.

In any of the foregoing embodiments of the first aspect of the present application, $0.15\leq I_1/I_2\leq0.4$. $I_1/I_2$ of the negative active material satisfies the above relationship, which can further improve the initial coulombic efficiency and charge-discharge cycle life of the battery.

In any of the foregoing embodiments of the first aspect of the present application, $0.3\leq I_3/I_2\leq0.8$. $I_3/I_2$ of the negative active material satisfying the above relationship can further improve the rate performance and charge-discharge cycle life of the battery, and further improve the initial coulombic efficiency of the battery.

In any of the foregoing embodiments of the first aspect of the present application, the negative active material has a Raman spectrum comprising peaks at the Raman shifts of 1300 cm$^{-1}$~1380 cm$^{-1}$ and 1520 cm$^{-1}$~1590 cm$^{-1}$ in which the peak at the Raman shifts of 1300 cm$^{-1}$~1380 cm$^{-1}$ has a peak intensity recorded as ID, and the peak at the Raman shifts of 1520 cm$^{-1}$~1590 cm$^{-1}$ has a peak intensity recorded as $I_G$, and the peak intensity $I_D$ and the peak intensity $I_G$ satisfy $1.05\leq I_D/I_G\leq1.50$; optionally, $1.1\leq I_D/I_G\leq1.45$. $I_D/I_G$ of the negative active material satisfying the above relationship can further improve the cycle performance of the battery, and aslo improve the initial coulombic efficiency and the energy density of the battery.

In any of the foregoing embodiments of the first aspect of the present application, a full width at half maxima of the negative active material at the Raman shifts of 1300 cm$^{-1}$~1380 cm$^{-1}$ is from 120 cm$^{-1}$ to 160 cm$^{-1}$, optionally from 128 cm$^{-1}$ to 152 cm$^{-1}$. The negative active material has a peak at the Raman shifts of 1300 cm$^{-1}$~1380 cm$^{-1}$ and a full width at half maxima within the given range, which can further improve the cycle performance of the secondary battery.

In any of the foregoing embodiments of the first aspect of the present application, the modified polymer coating layer contains sulfur element and carbon element.

Optionally, a mass percentage of the sulfur element is from 0.5% to 3% of the mass of the negative active material, optionally from 0.8% to 1.5%. The content of the sulfur element in the negative active material is within the above range, which can further improve the cycle performance and energy density of the secondary battery.

Optionally, a mass percentage of the carbon element is from 0.1% to 4% of the mass of the negative active material, optionally from 0.5% to 3%. The content of the carbon element in the negative e active material is within the above range, which can further improve the cycle performance and energy density of the secondary battery.

In any of the foregoing embodiments of the first aspect of the present application, the negative active material has an X-ray diffraction pattern including a diffraction peak at the diffraction angle 2 θ of 19° to 27° and the diffraction peak has a full width at half maxima of 4° to 12°, and optionally 5° to 10°. The negative active material has a diffraction peak at the position where the 2θ is 19°~27° and the full width at half maxima is within the given range, which can further improve the energy density and cycle life of the battery.

In any of the foregoing embodiments of the first aspect of the present application, the negative active material has a volume average particle diameter $D_v50$ of 2 μm-12 μm, optionally 4 μm-8 μm. The $D_v50$ of the negative active material is within the given range, which can further improve the energy density and cycle life of the battery.

In any of the foregoing embodiments of the first aspect of the present application, the negative active material has a volume particle size distribution $D_v10$, a volume average particle size $D_v50$, and a volume particle size distribution $D_v90$ satisfying: $0.5 \leq (D_v90-D_v10)/D_v50 \leq 2.5$; optionally, $0.8 \leq (D_v90-D_v10)/D_v50 \leq 2.0$. The particle size distribution $(D_v90-D_v10)/D_v50$ of the negative active material is within the above range, which can further improve the cycle performance of the battery.

In any of the foregoing embodiments of the first aspect of the present application, the negative active material has a specific surface area of 0.5 m²/g to 5 m²/g, optionally 0.8 m²/g-3 m²/g. The specific surface area of the negative active material is within the above range, which can further improve the cycle performance of the secondary battery while meeting the dynamic performance and rate performance requirements of the secondary battery.

In any of the foregoing embodiments of the first aspect of the present application, the negative active material has a tap density of 0.8 g/cm³ to 1.3 g/cm³, optionally 0.9 g/cm³ to 1.2 g/cm³. The tap density of the negative active material is within the given range, which can increase the energy density of the secondary battery.

In any of the foregoing embodiments of the first aspect of the present application, the negative active material has a compacted density of 1.1 g/cm³ to 1.6 g/cm³ measured under a pressure of 5 tons (equivalent to 49 KN), optionally 1.2 g/cm³ to 1.5 g/cm³. The compacted density of the negative active material measured after holding the pressure for 30 seconds under a pressure of 5 tons (equivalent to 49 KN) is within the given range, which can increase the energy density of the secondary battery.

The second aspect of the present application provides a method for preparing a negative active material, including the following steps (1), (2), (3), optional step (2-1), and optional step (3-1):

(1) dissolving a certain mass of a polymer in a solvent to obtain a solution; wherein the polymer is selected from at least one of polyacrylonitrile, polyaniline, polyethylene, polyacetylene, polyvinyl chloride and polystyrene;

(2-1) crushing $SiO_x$ material to obtain $SiO_x$ particles with a certain particle size, in which $0<x<2$;

(2) mixing the $SiO_x$ particles with the solution obtained in step (1) to obtain a mixture, in which $0<x<2$;

(3-1) drying the mixture obtained in step (2) to obtain a solid;

(3) mixing the mixture obtained in step (2) or the solid obtained in step (3-1) with a certain mass of sulfur powder, and then performing heat treatment in an inert atmosphere to obtain a negative active material; optionally, the negative active material is the negative active material according to the first aspect of the present application.

The negative active material obtained by the method provided in this application comprises $SiO_x$ ($0<x<2$) and a modified polymer coating layer covering at least part of the outer surface of the $SiO_x$ ($0<x<2$), wherein the negative active material has a Raman spectrum comprising peaks at the Raman shifts of 280 cm⁻¹~345 cm⁻¹, 450 cm⁻¹~530 cm⁻¹ and 900 cm⁻¹~960 cm⁻¹, in which the peak at the Raman shifts of 280 cm⁻¹~345 cm⁻¹ has a peak intensity recorded as $I_1$, the peak at the Raman shifts of 450 cm⁻¹~530 cm⁻¹ has a peak intensity recorded as $I_2$, and the peak at the Raman shifts of 900 cm⁻¹~960 cm⁻¹ has a peak intensity recorded as $I_3$, and $I_1$, $I_2$ and $I_3$ satisfy $0.1 \leq I_1/I_2 \leq 0.6$, $0.2 \leq I_3/I_2 \leq 1.0$; by making the modified polymer coating have a higher toughness and higher ion conductivity, the cycle coulombic efficiency of the material is improved, so that the initial coulombic efficiency and cycle performance of the secondary battery are greatly improved. Therefore, the initial coulombic efficiency and cycle performance of the secondary battery using the negative active material of the present application are improved, and the energy density is improved.

In any of the foregoing embodiments of the second aspect of the present application, in step (1), a ratio of the mass of the polymer to the volume of the solvent is from 0.1 g/L to 10 g/L, optionally from 1 g/L to 5 g/L. The appropriate amount of polymer added is beneficial to improving the particle size distribution of the negative active material, wherein the $D_v10$, $D_v50$ and $D_v90$ of the negative active material can be made within an appropriate range, thereby improving the energy density and cycle performance of the secondary battery.

In any of the foregoing embodiments of the second aspect of the present application, the mass ratio of the $SiO_x$ particles in step (2) to the polymer in step (1) is from 10 to 200, and optionally from 20 to 100. The mass ratio of the $SiO_x$ particles and the polymer is in an appropriate range, which is beneficial to enabling the secondary battery to have a higher energy density and cycle performance.

In any of the foregoing embodiments of the second aspect of the present application, the ratio of the mass of the sulfur powder to the mass of the polymer is (1~5):1, optionally (2~4):1. The mass ratio of sulfur powder to polymer is in an appropriate range, which is conducive to making the secondary battery have higher energy density, initial coulombic efficiency and cycle performance.

In any of the foregoing embodiments of the second aspect of the present application, the heat treatment temperature is from 250° C. to 450° C., optionally from 300° C. to 450° C., or from 380° C. to 430° C. The heat treatment temperature within the above range can improve the cycle performance of the battery.

In any of the foregoing embodiments of the second aspect of the present application, the heat treatment time is from 2 to 8 hours, optionally from 3 to 5 hours.

In a third aspect of the present application, a secondary battery is provided, which including the negative active material according to the first aspect of the present application or the negative active material obtained by the preparation process according to the second aspect of the present application.

The secondary battery of the present application have high energy density, highe initial coulombic efficiency and long cycle performance since it adopts the negative active material of the present application.

In a fourth aspect of the present application, a battery module is provided, which including the secondary battery according to the third aspect of the present application.

In a fifth aspect of the present application, a battery pack is provided, which including the battery module according to the fourth aspect of the present application.

In a sixth aspect of the present application, an apparatus is provided, which includes at least one of the secondary battery according to the third aspect of the present application, the battery module according to the fourth aspect of the present application, or the battery pack according to the fifth aspect of the present application.

The battery module, battery pack and apparatus of the present application includes the secondary battery according to the present application, thus has at least the same or similar technical effect as the secondary battery.

DETAILED DESCRIPTION

Figure 1:
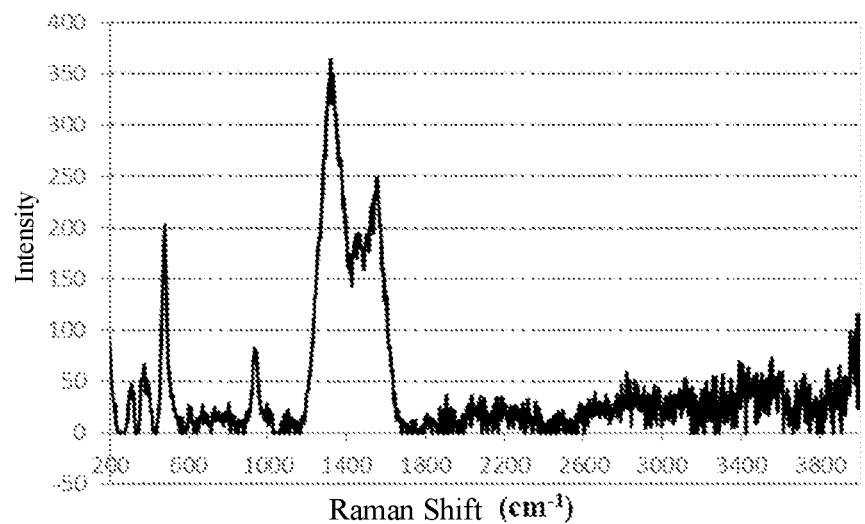
FIG. 1 is a Raman spectrum of a negative active material according to the present application.

In order to make the object, technical solution, and technical effects of the present application apparent, the following further describes the present application in detail with reference to the embodiments. It should be understood that the embodiments described in the present description are only for explaining the present application, and are not intended to limit the application.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

In a first aspect of the present application, a negative active material is provided, comprising $SiO_x$ particles and a modified polymer coating layer covering the $SiO_x$ particles, in which $0<x<2$; the negative active material has a Raman spectrum comprising peaks at the Raman shifts of 280 cm$^{-1}$~345 cm$^{-1}$, 450 cm$^{-1}$~530 cm$^{-1}$ and 900 cm$^{-1}$~960 cm$^{-1}$, in which the peak at the Raman shifts of 280 cm$^{-1}$~345 cm$^{-1}$ has a (scattering) peak intensity recorded as $I_1$, the peak at the Raman shifts of 450 cm$^{-1}$~530 cm$^{-1}$ has a (scattering) peak intensity recorded as $I_2$, and the peak at the Raman shifts of 900 cm$^{-1}$~960 cm$^{-1}$ has a (scattering) peak intensity recorded as $I_3$, and $I_1$, $I_2$ and $I_3$ satisfy $0.1 \leq I_1/I_2 \leq 0.6$, $0.2 \leq I_3/I_2 \leq 1.0$.

Without being bound by theory, the scattering peak of the negative active material of the present application at the Raman shifts of 450 cm$^{-1}$~530 cm$^{-1}$ is attributed to the silicon oxide compound (hereinafter referred to as the $SiO_x$ peak); the scattering peak of the negative active material of the present application at the Raman shift of 280 cm$^{-1}$~345 cm$^{-1}$ is attributed to the C-S bond (hereinafter referred to as the C-S peak), and the C-S bond makes the coating layer have higher toughness; the scattering peak of the negative active material of the present application at the Raman shifts of 900 cm$^{-1}$~960 cm$^{-1}$ is attributed to the S-S bond (hereinafter referred to as the S-S peak), and the S-S bond makes the coating layer have higher active ion conductivity. During battery's charging, the S-S bond breaks and combines with active ions to carry out ion migration and has a high migration rate. During battery discharging, the active ions are released, and the S-S bonds are re-bonded. During battery charging and discharging, only the breaking and bonding of S-S bonds occur in the process, and the structure of the carbon-based skeleton remains unchanged, which ensures the protective effect of the coating layer on the silicon-oxygen compound.

Without being bound by theory, the $SiO_x$ in the negative active material of the present application has a higher gram capacity and a longer cycle life, which improves the cycle performance and energy density of the secondary battery.

Without being bound by theory, the modified polymer coating layer in the negative active material of the present application has strong toughness, can well adapt to the expansion and contraction of the $SiO_x$ material in the process of lithium deintercalation, and protects the $SiO_x$ material. In addition, the modified polymer coating layer has high active ion conductivity, inhibits the side reaction of the electrolyte on the surface of the material, ensures the gram capacity of the $SiO_x$ material, reduces the consumption of active ions, reduces the irreversible capacity of the battery, and thus improves the coulombic efficiency and cycle performance of the secondary battery.

In some embodiments of the first aspect of the present application, $I_1/I_2$ may be $\geq 0.1$, $\geq 0.12$, $\geq 0.14$, $\geq 0.18$, $\geq 0.2$, $\geq 0.25$, or $\geq 0.27$. $I_1/I_2$ may be $\leq 0.6$, $\leq 0.57$, $\leq 0.56$, $\leq 0.5$, $\leq 0.48$, $\leq 0.38$, $\leq 0.32$, or $\leq 0.27$. Optionally, $0.15 \leq I_1/I_2 \leq 0.4$, $0.18 \leq I_1/I_2 < 0.38$, $0.2 \leq I_1/I_2 \leq 0.32$, or $0.2 \leq I_1/I_2 \leq 0.27$, etc. The peak intensity of the C-S peak and the peak intensity of the $SiO_x$ peak meet the above relationship, thus the coating layer can have better toughness, better adapt to the expansion and contraction of the silicon-oxygen compound in the process of lithium deintercalation, protect the silicon-oxygen compound and inhibit the side reaction of the electrolyte on the surface of the material, thereby further improving the battery's charge-discharge cycle life.

In some embodiments of the first aspect of the present application, $I_3/I_2$ may be $\geq 0.2$, $\geq 0.24$, $\geq 0.28$, $\geq 0.3$, $\geq 0.32$, $\geq 0.45$, or $\geq 0.51$; $I_3/I_2$ may be $\leq 1.0$, $\leq 0.95$, $\leq 0.8$, $\leq 0.79$, $\leq 0.75$, $\leq 0.66$, or $\leq 0.6$. Optionally, $0.3 \leq I3/I2 \leq 0.8$, $0.32 < I3/I2 \leq 0.8$, $0.45 \leq I3/I2 \leq 0.75$, or $0.45 \leq I3/I2 \leq 0.6$, etc. The peak intensity of the S-S peak and the peak intensity of the $SiO_x$ peak satisfy the above relationship, so that the coating layer has better active ion conductivity, thereby further improving the rate performance and charge-discharge cycle life of the material.

In some embodiments of the first aspect of the present application, the coating is partial coating and/or full coating. Optionally, the coating is full coating.

In some embodiments of the first aspect of the present application, the coating is contact coating and/or non-contact coating, wherein the contact coating means that the modified polymer coating layer covers the $SiO_x$ particles and contracts the surface of the $SiO_x$ particles. On the contrary, non-contact coating means that the modified polymer coating layer covers the $SiO_x$ particles but does not contact the surface of the $SiO_x$ particles.

In some embodiments of the first aspect of the present application, $0.5 \leq x \leq 1.6$. Optionally, x is close to 1, $0.9 \leq x \leq 1.2$, such as 1. The value of x in the $SiO_x$ is within the above range, which is beneficial to ensuring that the negative active material has a higher gram capacity and a longer cycle life, thereby improving the cycle performance and energy density of the secondary battery.

In some embodiments of the first aspect of the present application, the intensity of the (scattering) peak of the negative active material at the Raman shifts of 1300 cm$^{-1}$ to 1380 cm$^{-1}$ is recorded as $I_D$, and the intensity of the (scattering) peak of the negative active material at the Raman shifts of 1520 cm$^{-1}$ to 1590 cm$^{-1}$ is recorded as $I_G$, and $1.05 \leq I_D/I_G \leq 1.50$.

The ratio of peak intensity $I_D$ of peak D to peak intensity $I_G$ of peak G within the above range can reduce the irreversible capacity of the material during charge and discharge cycles, while ensuring that the coating layer has better electrical conductivity, which is conducive to the capacity efficacy of the material. It can further improve the cycle capacity retention rate of the material, thereby further improving the cycle performance and energy density of secondary batteries using such negative active materials.

In some embodiments of the first aspect of the present application, $I_D/I_G$ may be $\leq 1.5$, $\leq 1.48$, $\leq 1.45$, $\leq 1.42$, $\leq 1.40$, $\leq 1.37$, $\leq 1.35$, $\leq 1.33$, or $\leq 1.30$; $I_D/I_G$ may be $\geq 1.28$, $\geq 1.25$, $\geq 1.23$, $\geq 1.20$, $\geq 1.18$, $\geq 1.15$, $\geq 1.12$, $\geq 1.10$, $\geq 1.08$, or $\geq 1.05$. Optionally, $1.1 \leq I_D/I_G \leq 1.45$. $I_D/I_G$ within the given range can further improve the cycle performance and energy density of secondary batteries using such negative active materials.

In some embodiments of the first aspect of the present application, the full width at half maxima of the (scattering) peak of the negative active material at the Raman shifts of 1300 cm$^{-1}$~1380 cm$^{-1}$ is from 120 cm$^{-1}$ to 160 cm$^{-1}$, optionally from 128 cm$^{-1}$ to 152 cm$^{-1}$.

In the Raman spectrum of the negative active material, the full width at half maxima of the peak D can be selected to be more than or equal to 120 cm$^{-1}$, for example, more than or equal to 128 cm$^{-1}$, which can further improve the elasticity and toughness of the coating layer and make the coating layer better adapt to the expansion and contraction of silicon-oxygen compound during charge and discharge without cracking. The full width at half maxima of the peak D can be selected to be less than or equal to 160 cm$^{-1}$, for example, less than or equal to 152 cm$^{-1}$, which can ensure that the coating layer has higher conductivity and further improve the cycle performance of the secondary battery.

In some embodiments of the first aspect of the present application, the aforementioned scattering peak within the Raman shift range comprises the scattering peak at the end value of the Raman shift.

In some embodiments of the first aspect of the present application, the modified polymer coating layer contains sulfur element and carbon element.

In some embodiments of the first aspect of the present application, a content of sulfur element in the negative active material may be from 0.5% to 3% by mass, for example, from 0.8% to 1.5% by mass.

The content of sulfur element in the negative active material may be selected to be 0.5% or more, for example, 0.8% or more, which can further increase the content of C-S and S-S groups in the coating layer, further improve the toughness and active ion conduction rate of the coating layer, and reduce battery polarization. The content of sulfur element may be selected to be 3% or less, for example 1.5% or less. On the one hand, the coating layer has higher toughness and ion conductivity, and it also has a lower thickness to further reduce the degree of material capacity reduction caused by the increase of the coating layer's content. On the other hand, the residual elemental sulfur in the material is further reduced, so as to further reduce the degree of material capacity reduction caused by the completely irreversible reaction between elemental sulfur and active ions. Therefore, the content of sulfur element in the negative active material is within the above range, which can further improve the cycle performance and energy density of the secondary battery.

In some embodiments of the first aspect of the present application, a content of carbon element in the negative active material may be from 0.1% to 4% by mass, for example, from 0.5% to 3% by mass. The content of carbon element in the negative active material is within the above range, which is beneficial to making the coating layer have higher electronic conductivity, and can also make the coating layer have better elasticity and toughness, and better protect the silicon oxide compound, thus further improving the cycle performance and energy density of the secondary battery.

In some embodiments of the first aspect of the present application, the modified polymer coating layer is formed by heat treatment of polymer and sulfur powder in an inert atmosphere. Optionally, the polymer is selected from at least one of polyacrylonitrile, polyaniline, polyethylene, polyacetylene, polyvinyl chloride and polystyrene.

Optionally, the temperature of the heat treatment is from 250° C. to 450° C., for example, from 300° C. to 450° C.

Optionally, the mass ratio of sulfur powder to polymer is (1~5):1, for example (2~4):1, etc.

Optionally, the heat treatment time may be from 2 to 8 hours, for example, from 3 to 5 hours.

Optionally, the inert atmosphere is selected from one or more of nitrogen atmosphere, argon atmosphere and helium atmosphere.

In some embodiments of the first aspect of the present application, the full width at half maxima of the peak of the negative active material in the range for 2θ of 19°~27° in the X-ray diffraction spectrum is from 4° to 12°, for example, from 5° to 10°. The negative active material with diffraction peaks in the position of 19°~27° for 2θ and the full width at half maxima within the given range has higher gram capacity and lower cycle expansion, which is not easy to cracking and pulverize during the charge and discharge cycle of the secondary battery, so the cycle life of the battery can be further improved.

In some embodiments of the first aspect of the present application, the volume average particle diameter $D_v50$ of the negative active material is from 2 μm to 12 μm, for example, from 4 μm to 8 μm, from 4 μm to 6.4 μm, or from 5.9 μm to 6.3 μm.

The WO of the negative active material may be selected to be 2 μm or more, for example, 4 μm or more, which can reduce the film-forming consumption of active ions on the negative electrode, and reduce the side reaction of the electrolyte on the negative electrode, thereby reducing the irreversible capacity of the secondary battery and improving the cycle performance of the secondary battery. It can also reduce the amount of binder in the negative electrode, which is beneficial to improving the energy density of the secondary battery.

The $D_v50$ of the negative active material may be selected to be 12 μm or less, for example, 8 μm or less, which is beneficial to increasing the conductivity of active ions and electrons, and also is beneficial to preventing particles from cracking or pulverizing during charge and discharge, thereby improving the cycle performance of the secondary battery.

In some embodiments of the first aspect of the present application, the volume particle size $D_v10$, the volume average particle size $D_v50$, and the volume particle size Dv90 of the negative active material satisfy: $0.5 \leq (Dv90-$ Dv10)/Dv50≤2.5. The negative active material with such particle size distribution can reduce the side reaction of the negative electrode film and reduce the consumption of the electrolyte. It is also beneficial to preventing the particles from cracking or breaking during the charging and discharging process, improving the structural stability of the material, and further improving the cycle performance of the battery.

In some embodiments of the first aspect of the present application, optionally, 0.8≤(Dv90−Dv10)/Dv50≤2.0. For example, 1.02≤(Dv90−Dv10)/Dv50≤1.48, 1.16≤(Dv90−Dv10)/Dv50≤1.48, or 1.18≤(Dv90−Dv10)/Dv50≤1.21, etc.

In some embodiments of the first aspect of the present application, the specific surface area of the negative active material is from 0.5 m$^2$/g to 5 m$^2$/g. For example, the specific surface area of the negative active material is ≥0.8 m$^2$/g, ≥1 m$^2$/g, ≥1.2 m$^2$/g, ≥1.5 m$^2$/g, ≥1.7 m$^2$/g, ≥1.9 m$^2$/g, ≥2 m$^2$/g, ≥2.1 m$^2$/g, ≥2.3 m$^2$/g, or ≥2. 5 m$^2$/g. For example, the specific surface area of the negative active material is ≤2.7 m$^2$/g, ≤3 m$^2$/g, ≤3.1 m$^2$/g, ≤3.3 m$^2$/g, ≤3.5 m$^2$/g, ≤3.7 m$^2$/g, ≤3.9 m$^2$/g, ≤4 m$^2$/g, ≤4.2 m$^2$/g, ≤4.4 m$^2$/g, ≤4.6 m$^2$/g, ≤4.8 m$^2$/g, or ≤4.9 m$^2$/g. Optionally, the specific surface area of the negative active material may be from 0.8 m$^2$/g to 3 m$^2$/g, from 1.0 m$^2$/g to 3 m$^2$/g, from 1.5 m$^2$/g to 5 m$^2$/g, or from 1.7 m$^2$/g to 3.5 m$^2$/g, etc.

The specific surface area of the negative active material may be selected to be 0.5 m$^2$/g or more, for example, 0.8 m$^2$/g or more, then the surface of the material has more active sites, which can improve the electrochemical performance of the material and meet the requirements of the secondary battery for dynamic performance and rate performance. The specific surface area of the negative active material can be selected to be 5 m$^2$/g or less, for example, 3 m$^2$/g or less, which is beneficial to reducing the side reaction of the electrolyte on the negative electrode, and can also reduce the film-forming consumption of active ions on the negative electrode, thereby improving the cycle performance of battery.

In some embodiments of the first aspect of the present application, the tap density of the negative active material is from 0.8 g/cm$^3$ to 1.3 g/cm$^3$, for example, from 0.9 g/cm$^3$ to 1.2 g/cm 3, etc. The tap density of the negative active material is within the given range, which is beneficial to increasing the energy density of the secondary battery.

In some embodiments of the first aspect of the present application, the negative active material is kept under a pressure of 5 tons (equivalent to 49 KN) for 30 seconds and then released. The measured compacted density is from 1.1 g/cm$^3$ to 1.6 g/cm$^3$, for example, from 1.2 g/cm$^3$ to 1.5 g/cm$^3$. The compacted density of the negative active material measured after that the material is kept at a pressure of 5 tons (equivalent to 49 KN) for 30 seconds and then released is within the given range, which is beneficial to increasing the energy density of the secondary battery.

In the present application, the Raman spectrum of the negative active material can be measured by instruments and methods known in the art. For example, a Raman spectrometer is used, as a specific example, LabRAM HR Evolution laser microscopic Raman spectrometer.

In the present application, the (scattering) peak intensity of the negative active material in a certain Raman shift range refers to the maximum value of the intensity value in the Raman shift range of the Raman spectrum.

In the present application, the X-ray diffraction spectrum of the negative active material can be measured by instruments and methods known in the art. For example, an X-ray diffractometer is used to measure the X-ray diffraction spectrum in accordance with JIS K0131-1996 X-ray Diffraction Analysis General Principles.

In the present application, the contents of carbon and sulfur elements in the negative active material can be determined by using instruments and methods known in the art. For example, HCS-140 carbon analyzer is used for testing in accordance with GB/T 20123-2006/ISO 15350: 2000 and JJG 395-1997.

In the present application, $D_v10$, $D_v50$, and $D_v90$ of the negative active material have the meanings commonly known in the art, and can be measured with instruments and methods known in the art, for example, with a laser particle size analyzer, such as Mastersizer 3000 laser particle size analyzer from Malvern Instruments Co., Ltd., UK.

In the context, the physical definitions of $D_v10$, $D_v50$ and $D_v90$ are as follows:

$D_v10$=the particle size when the cumulative volume distribution percentage of the material reaches 10%;

$D_v50$ =the particle size when the cumulative volume distribution percentage of the material reaches 50%;

$D_v90$=the particle size when the cumulative volume distribution percentage of the material reaches 90%.

In the present application, the specific surface area of the negative active material has a meaning commonly known in the art, and can be measured with instruments and methods known in the art. For example, the specific surface area may be measured with nitrogen adsorption specific surface area analysis with reference to GB/T 19587-2004 (Determination of the specific surface area of solids by gas adsorption using the BET method), and calculated by the BET (Brunauer Emmett Teller) method, in which the nitrogen adsorption specific surface area analysis can be carried out by a specific surface and pore size distribution analyzer of Type: Tri Star II 3020 from Micromeritics, USA.

In the present application, the tap density of the negative active material is a well-known meaning in the art, and it can be measured with a well-known instrument and method in the art, for example, it can be conveniently measured with a tap density meter, and for example, the BT-300 type tap density tester.

In the present application, the compacted density of the negative active material a well-known meaning in the art and can be measured with instruments and methods known in the art. For example, with reference to GB/T24533-2009 standard, it can be measured by an electronic pressure tester, such as UTM7305 electronic pressure tester. 1 g of the sample is accurately weighed, added to a mold with a bottom area of 1.327 cm$^2$, applied a pressure of 5 tons (corresponding to 49 KN) and kept under this pressure for 30 seconds; then the pressure is released and kept for 10 seconds, and then the compacted density of the negative active material is recorded and calculated.

The second aspect of the present application relates to a method for preparing a negative active material, including the following steps (1), (2), (3), optional step (2-1), and optional step (3-1):

(1) dissolving a certain mass of a polymer in a solvent to obtain a solution; wherein the polymer is selected from at least one of polyacrylonitrile, polyaniline, polyethylene, polyacetylene, polyvinyl chloride and polystyrene;

(2-1) crushing SiO$_x$ material to obtain SiO$_x$ particles with a certain particle size, in which 0<x<2;

(2) mixing the SiO$_x$ particles with the solution obtained in step (1) to obtain a mixture, in which 0<x<2;

(3-1) drying the mixture obtained in step (2) to obtain a solid;

(3) mixing the mixture obtained in step (2) or the solid obtained in step (3-1) with a certain mass of sulfur powder, and then performing heat treatment in an inert atmosphere to obtain a negative active material;

In some embodiments of the second aspect of the present application, the $SiO_x$ particles are commercially available $SiO_x$ particles with a certain particle size.

In some embodiments of the second aspect of the present application, in step (1), the solvent is selected from at least one of dimethylformamide (DMF), N-methylpyrrolidone (NMP), dimethylbenzene (DMB) and toluene (MB).

In some embodiments of the second aspect of the present application, in step (1), the ratio of the polymer (mass) to the solvent (volume) is from 0.1 g/L to 10 g/L. For example, the ratio of the polymer to the solvent is ≥0.7 g/L, ≥1 g/L, ≥1.5 g/L, ≥2 g/L, ≥2.5 g/L, or ≥3 g/L. For example, the ratio of the polymer to the solvent is ≤3.5 g/L, ≤4 g/L, ≤5 g/L, ≤6 g/L, ≤7 g/L, ≤8 g/L, or ≤9 g /L. Optionally, the ratio of the polymer to the solvent is from 1 g/L to 5 g/L.

In some embodiments of the second aspect of the present application, the mass ratio of the $SiO_x$ particles in step (2) to the polymer in step (1) is from 10 to 200. For example, the mass ratio of the $SiO_x$ particles in step (2) to the polymer in step (1) is ≥15, ≥20, ≥25, or ≥30. For example, the mass ratio of the $SiO_x$ particles in step (2) to the polymer in step (1) is ≤30, ≤35, ≤45, ≤40, ≤50, ≤55, ≤60, ≤65, ≤70, ≤75, ≤80, ≤85, ≤90, ≤100, ≤110, ≤120, ≤130, ≤150, ≤170, or ≤190. Optionally, the mass ratio of the $SiO_x$ particles in step (2) to the polymer in step (1) is from 20 to 100.

The higher the mass content of the polymer is, the higher the content of carbon element in the coating layer of the negative active material will be. The mass ratio of silicon-oxygen compound to polymer is within the above range, ensuring the protective effect of the coating layer on the silicon-oxygen compound, it can also effectively prevent agglomeration of the negative active material during the preparation process, and is beneficial to making the material have high active ion conductivity during discharge.

In some embodiments of the second aspect of the present application, in step (3-1), the drying temperature is from 80° C. to 250° C., such as from 110° C. to 200° C., or from 180° C. to 200° C., such as 90° C., 100° C. ° C., 110° C., 120° C., 130° C., 140° C., 150° C., 160° C., 170° C., 180° C. 200° C., 230° C., 250° C., etc.

In some embodiments of the second aspect of the present application, in step (3-1), the drying time is from 0.5 to 10 hours, for example, from 1 to 9 hours, or from 2 to 5 hours, etc., such as 2, 3, 4, 5, 6, 7, 8, or 9 hours, etc.

In some embodiments of the second aspect of the present application, in step (3-1), the heating rate during drying is from 1° C./min to 10° C./min, for example, from 1° C./min to 5° C./min, etc.

In some embodiments of the second aspect of the present application, in step (3-1), drying is performed in an inert atmosphere.

Optionally, the inert atmosphere is selected from one or more of nitrogen atmosphere, argon atmosphere and helium atmosphere.

In some embodiments of the second aspect of the present application, in step (3-1), equipment and methods known in the art may be used to dry the mixture, such as vacuum drying, airflow drying, spray drying, and the like. As an example, a wet coating machine amy be used.

Without being bound by theory, in step (3), the sulfur powder and the polymer undergo a cross-linking reaction under an inert atmosphere to improve the elasticity and toughness of the coating layer, and at the same time to improve the ion conductivity of the coating layer, thereby improving the battery cycle performance.

In some embodiments of the second aspect of the present application, in step (3), the heat treatment temperature is from 250° C. to 450° C., such as from 300° C. to 450° C., or from 380° C. to 430° C., such as 250° C., 270° C., 280° C. ° C., 300° C., 320° C., 350° C., 360° C., 380° C., 400° C., 420° C., 440° C., or 450° C. The heat treatment temperature within the above range can ensure that the coating layer will not be completely carbonized, which is beneficial to further improving the elasticity and toughness of the coating layer, so as to better adapt to the expansion and contraction of the silicon oxide compound during the charging and discharging process; and the obtained coating layer can effectively isolate the silicon-oxygen compound from the electrolyte, reduce side reactions, and improve the cycle performance of the battery.

In some embodiments of the second aspect of the present application, in step (3), the heat treatment time is from 2 to 8 hours, for example, from 3 to 5 hours.

In some embodiments of the second aspect of the present application, in step (3), the inert atmosphere is selected from one or more of nitrogen atmosphere, argon atmosphere and helium atmosphere.

In some embodiments of the second aspect of the present application, the mass ratio of sulfur powder to polymer is (1~5):1, for example (2~4):1, etc. The mass ratio of sulfur powder to polymer is within the above range, which is beneficial to making the coating layer of the negative active material have higher electronic conductivity and active ion conductivity at the same time, and to avoid the presence of elemental sulfur residues in the coating layer, and effectively prevent the the capacity loss caused by the irreversible reaction between residual elemental sulfur and active ions, thereby helping to ensure that the battery has a higher cycle performance. In addition, the mass ratio of the sulfur powder to the polymer is within the above range, so that the sulfur powder can fully crosslink the polymer and improve the elasticity and toughness of the coating layer.

The negative active material prepared by the method described in the second aspect of the present application is the negative active material described in the first aspect of the present application.

In some embodiments of the present application, the weight average molecular weight of polyacrylonitrile, polyaniline, polyethylene, polyacetylene, polyvinyl chloride, or polystyrene is from 50,000 to 200,000, such as from 50,000 to 150,000.

In some embodiments of the present application, the molecular weight distribution coefficient of polyacrylonitrile, polyaniline, polyethylene, polyacetylene, polyvinyl chloride, or polystyrene is a molecular weight distribution coefficient known in the art, such as from 1.1 to 1.5, or from 1.2 to 1.5, etc.

In some embodiments of the present application, the particle size of the SiOx particles may be from 1.5 μm to 11 μm, for example, from 2 μm to 7.5 μm.

The third aspect of the present application provides a secondary battery comprising the negative active material according to the first aspect of the present application.

The secondary battery of the present application has both long-cycle performance and high energy density.

In some embodiments of the third aspect of the present application, the secondary battery comprises a positive electrode plate, a negative electrode plate, a separator, and an electrolyte. The negative electrode comprises a negative current collector and a negative electrode film disposed on at least one surface of the negative current collector, wherein the negative electrode film comprises the negative active material according to the first aspect of the present application.

In some embodiments of the third aspect of the present application, the negative electrode current collector can be made of a material with good conductivity and mechanical strength, preferably copper foil.

In some embodiments of the third aspect of the present application, the negative electrode film further comprises a carbon material, and the carbon material is selected from one or more of artificial graphite, natural graphite, mesocarbon microspheres (MCMB), hard carbon, and soft carbon. Optionally, the carbon material is selected from one or more of artificial graphite and natural graphite.

In some embodiments of the third aspect of the present application, the negative electrode film may optionally comprise one or more of a conductive agent, a binder, and a thickener, and there is no specific limitation on their types, and those skilled in the art can make selections according to actual needs.

The conductive agent includes but is not limited to graphite, superconducting carbon, acetylene black, carbon black, Ketjen black, carbon dots, carbon nanotubes, graphene, and carbon nanofibers.

The binder includes but is not limited to polyacrylic acid (PAA), sodium polyacrylate (PAAS), polyvinyl alcohol (PVA), styrene butadiene rubber (SBR), sodium carboxymethyl cellulose (CMC-Na), sodium alginate (SA), polymethacrylic acid (PMAA) and carboxymethyl chitosan (CMCS).

The thickener includes but is not limited to sodium carboxymethyl cellulose (CMC-Na).

The negative electrode plate can be prepared according to conventional methods in the art. For example, the negative active substance and optional conductive agent, binder and thickener are dispersed in a solvent which can be deionized water to form a uniform negative electrode slurry. The negative electrode slurry is coated on the negative electrode current collector. After being dried, cold pressed and other processes, a negative electrode plate is obtained.

In some embodiments of the third aspect of the present application, the positive electrode plate comprises a positive electrode current collector and a positive electrode film disposed on at least one surface of the positive electrode current collector and comprising a positive active substance. The type of the positive active material is not specifically limited, and materials useful for the secondary battery and known in the art can be used, and those skilled in the art can make selections according to actual needs.

The positive active substance includes, but is not limited to, lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

In some embodiments of the third aspect of the present application, the positive electrode current collector can be made of materials with good electrical conductivity and mechanical strength, preferably aluminum foil.

In some embodiments of the third aspect of the present application, the positive electrode film may further comprise a binder and/or a conductive agent. The types of the binder and the conductive agent are not specifically limited, and those skilled in the art can make selections according to actual needs.

The binder includes but are not limited to polyvinylidene fluoride (PVDF) and polytetrafluoroethylene (PTFE).

The conductive agent includes but are not limited to graphite, superconducting carbon, acetylene black, carbon black, Ketjen black, carbon dots, carbon nanotubes, graphene, and carbon nanofibers.

The above-mentioned positive electrode plate can be prepared according to conventional methods in the art, such as the coating method. For example, the positive active substance and optionally conductive agent and binder are dispersed in a solvent (such as N-methylpyrrolidone), to form a uniform positive electrode slurry, and the positive electrode slurry is coated on the positive electrode current collector. After being dried, cold pressed and other processes, the positive electrode plate is obtained.

In some embodiments of the third aspect of the present application, the electrolyte may be selected from at least one of solid electrolyte and liquid electrolyte (i.e. an electrolytic solution). The electrolyte salt containing active ions may be dispersed in an organic solvent to form the electrolyte solution. There is no particular limitation to the specific types of electrolyte salt and solvent, which can be selected according to actual needs.

The electrolyte salt includes but are not limited to $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

The solvent includes but are not limited to ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments of the third aspect of the present application, the electrolytic solution may optionally comprise an additive. The additive is not particularly limited and can be selected according to requirements. For example, the additives may comprise one or more of negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

In some embodiments of the third aspect of the present application, the separator is disposed between the positive electrode plate and the negative electrode plate to isolate them. The separator is not particularly limited, and any well-known porous structure separator having chemical stability and mechanical stability can be selected, such as one or more of glass fiber, non-woven fabric, polyethylene, polypropylene and polyvinylidene fluoride. The separator can be a single-layer film or a multilayer composite film. When the separator is a multilayer composite film, the materials of each layer may be the same or different.

The secondary battery can be prepared by a method commonly known in the art. As an example, a positive electrode plate, a separator, and a negative electrode plate are wound (or stacked) in order, so that the separator is located between the positive electrode plate and the negative electrode plate to act as isolation, thereby obtaining an electrode component. The electrode component is placed in a packaging case, and then an electrolytic solution is injected therein and sealed to obtain a secondary battery.

Figure 3:
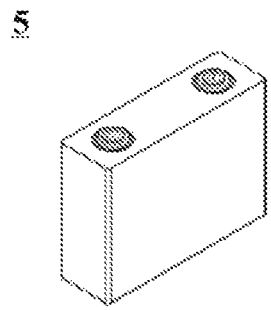
FIG. 3 is a perspective view of a secondary battery according to an embodiment of the present application.

The present application has no particular limitation on the shape of the secondary battery, which may be cylindrical, square or any other shapes. FIG. 3 shows a secondary battery 5 with a square structure as an example.

In some embodiments, the secondary battery may comprise an outer package. The outer package is used to package the positive electrode plate, the negative electrode plate and the electrolyte.

Figure 4:
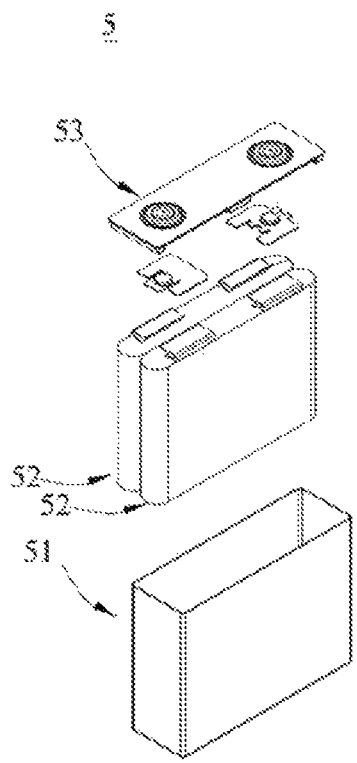
FIG. 4 is an exploded view of FIG. 3.

In some embodiments, referring to FIG. 4, the outer package may comprise a housing 51 and a cover 53, wherein the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolyte which can be an electrolytic solution is infiltrated in the electrode assembly 52. The number of electrode assemblies 52 contained in the secondary battery 5 can be one or more, which can be adjusted according to requirements.

In some embodiments, the outer package of the secondary battery may be a hard case, such as a hard plastic case, an aluminum case, a steel case. The outer package of the secondary battery may also be a soft bag, such as a pouch type soft bag. The material of the soft bag can be plastic, for example, it can comprise one or more of polypropylene (PP), polybutylene terephthalate (PBT), polybutylene succinate (PBS).

In some embodiments, the secondary battery can be assembled to form a battery module. The number of secondary batteries contained in the battery module can be multiple, and the specific number can be adjusted according to the application and capacity of the battery module.

Figure 5:
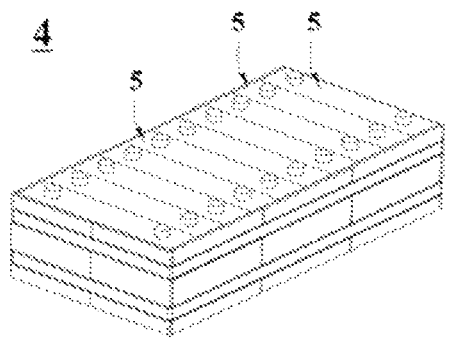
FIG. 5 is a perspective view of a battery module according to an embodiment of the present application.

FIG. 5 is a battery module 4 as an example. Referring to FIG. 5, in the battery module 4, a plurality of secondary batteries 5 may be arranged in sequence along the length direction of the battery module 4. Of course, it can also be arranged in any other manner. Further, the plurality of secondary batteries 5 can be fixed by fasteners.

Optionally, the battery module 4 may further comprise a housing with a receiving space, and a plurality of secondary batteries 5 are accommodated in the receiving space.

In some embodiments, the above-mentioned battery module can further be assembled into a battery pack. The number of battery modules contained in the battery pack can be adjusted according to the application and capacity of the battery pack.

Figure 6:
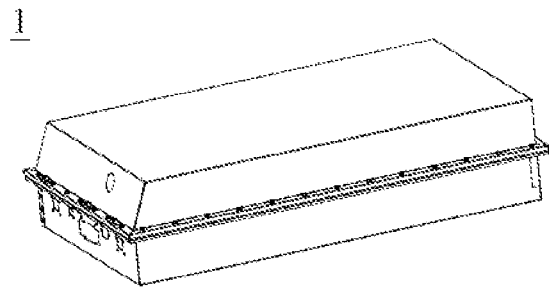
FIG. 6 is a perspective view of a battery pack according to an embodiment of the present application.
Figure 7:
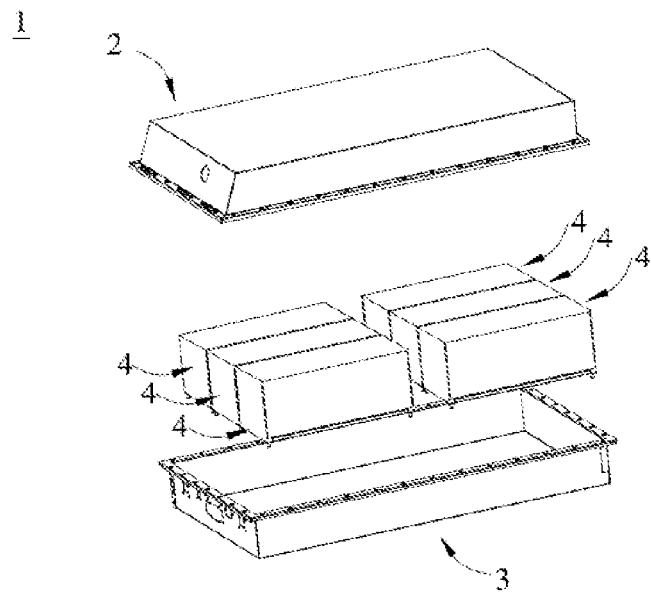
FIG. 7 is an exploded view of FIG. 6.

FIGS. 6 and 7 show the battery pack 1 as an example. Referring to FIGS. 6 and 7, the battery pack 1 may comprise a battery case and a plurality of battery modules 4 provided in the battery case. The battery case includes an upper case 2 and a lower case 3. The upper case 2 can be covered on the lower case 3 and forms a closed space for accommodating the battery module 4. Multiple battery modules 4 can be arranged in the battery box in any manner.

The present application further provides an apparatus comprising at least one of the secondary battery, battery module, or battery pack of the present application. The secondary battery, battery module or battery pack can be used as a power source of the apparatus, and can also be used as an energy storage unit of the apparatus. The apparatus can be, but is not limited to, mobile apparatus (such as mobile phones, notebook computers), electric vehicles (such as pure electric vehicles, hybrid electric vehicles, plug-in hybrid electric vehicles, electric bicycles, electric scooters, electric golf carts, electric trucks.), electric trains, ships and satellites, energy storage systems, etc. A secondary battery, a battery module, or a battery pack can be selected for the apparatus according to its usage requirements.

Figure 8:
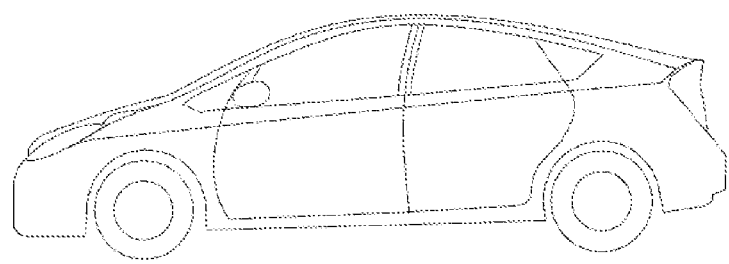
FIG. 8 is a schematic view showing an apparatus with a secondary battery as a power source according to an embodiment of the present application.

FIG. 8 is an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module can be used.

As another example, the apparatus may be a mobile phone, a tablet computer, a notebook computer, etc. The apparatus is generally required to be thin and light, and a secondary battery can be used as a power source.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, the recitation of "more" in the phrase "one or more" includes two or more.

The following examples are intended to describe the disclosure of the present application in more detail for only illustrative purpose, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Exemplary Embodiments

Embodiment 1. A negative active material comprising $SiO_x$ particles and a modified polymer coating layer covering the $SiO_x$ particles, in which $0 \leq x < 2$; wherein the negative active material has a peak intensity $I_1$ at the Raman shift ranging from 280 cm$^{-1}$ to 345 cm$^{-1}$, a peak intensity $I_2$ at the Raman shift ranging from 450 cm$^{-1}$ to 530 cm$^{-1}$, and a peak intensity $I_3$ at the Raman shift ranging from 900 cm$^{-1}$ to 960 cm$^{-1}$, and $I_1$, $I_2$ and $I_3$ satisfy $0.1 \leq I_1/I_2 \leq 0.6$, and $0.2 \leq I_3/I_2 \leq 1.0$.

Embodiment 2. The negative active material according to embodiment 1, wherein $0.15 \leq I_3/I_2 \leq 0.4$.

Embodiment 3. The negative active material according to embodiment 1 or 2, wherein $0.3 \leq I_3/I_2 \leq 0.8$.

Embodiment 4. The negative active material according to any one of embodiments 1-3, wherein the negative active material has a peak intensity $I_D$ at the Raman shift ranging from 1300 cm$^{-1}$ to 1380 cm$^{-1}$ and a peak intensity $I_G$ at the Raman shift ranging from 1520 cm$^{-1}$ to 1590 cm$^{-1}$, and the peak intensity $I_D$ and the peak intensity $I_G$ satisfy $1.05 \leq I_D/I_G \leq 1.50$; optionally, $1.1 \leq I_D/I_G \leq 1.45$.

Embodiment 5. The negative active material according to any one of embodiments 1-4, wherein a full width at half maxima of the negative active material at the Raman shifts of 1300 cm$^{-1}$~1380 cm$^1$ is from 120 cm$^{-1}$ to 160 cm$^{-1}$, optionally from 128 cm$^{-1}$ to 152 cm$^{-1}$.

Embodiment 6. The negative active material according to any one of embodiments 1-5, wherein the modified polymer coating layer comprises sulfur element and carbon element.

Embodiment 7. The negative active material according to embodiment 6, wherein a mass percentage of the sulfur element is from 0.5% to 3% of the mass of the negative active material, optionally from 0.8% to 1.5%; and/or, a mass percentage of the carbon element is from 0.1% to 4% of the mass of the negative active material, optionally from 0.5% to 3%.

Embodiment 8. The negative active material according to any one of embodiments 1-7, wherein the negative active material has an X-ray diffraction pattern comprising a diffraction peak at the diffraction angle 2 θ of 19° to 27° and the diffraction peak has a full width at half maxima of 4° to 12°, and optionally 5° to 10°.

Embodiment 9. The negative active material according to any one of embodiments 1-8, wherein the negative active material has a volume average particle diameter $D_v50$ of 2 μm-12 μm, optionally 4 μm-8 μm.

Embodiment 10. The negative active material according to any one of embodiments 1-9, wherein the negative active material has a volume particle size distribution $D_v10$, a volume average particle size $D_v50$, and a volume particle size distribution $D_v90$ satisfying: $0.5 \leq (D_v90-D_v10)/D_v50 \leq 2.5$; optionally, $0.8 \leq (D_v90-D_v10)/D_v50 \leq 2.0$.

Embodiment 11. The negative active material according to any one of embodiments 1-10, wherein the negative active material has a specific surface area of 0.5 m$^2$/g to 5 m$^2$/g, optionally 0.8 m$^2$/g-3 m$^2$/g.

Embodiment 12. The negative active material according to any one of embodiments 1-11, wherein the negative active material has a tap density of 0.8 g/cm$^3$ to 1.3 g/cm$^3$, optionally 0.9 g/cm$^3$ to 1.2 g/cm$^3$.

Embodiment 13. The negative active material according to any one of embodiments 1-12, wherein the negative active material has a compacted density of 1.1 g/cm$^3$ to 1.6 g/cm$^3$ measured under a pressure of 5 tons (equivalent to 49KN), optionally 1.2 g/cm$^3$ to 1.5 g/cm$^3$.

Embodiment 14. A method for preparing a negative active material, comprising the following steps (1), (2), (3), optional step (2-1), and optional step (3-1):
- (1) dissolving a certain mass of a polymer in a solvent to obtain a solution; wherein the polymer is selected from at least one of polyacrylonitrile, polyaniline, polyethylene, polyacetylene, polyvinyl chloride and polystyrene;
- (2-1) crushing SiO$_x$ material to obtain SiO$_x$ particles with a certain particle size, in which $0 \leq x \leq 2$;
- (2) mixing the SiO$_x$ particles with the solution obtained in step (1) to obtain a mixture, in which $0 < x < 2$;
- (3-1) drying the mixture obtained in step (2) to obtain a solid;
- (3) mixing the mixture obtained in step (2) or the solid obtained in step (3-1) with a certain mass of sulfur powder, and then performing heat treatment in an inert atmosphere to obtain a negative active material;
- optionally, the negative active material is the negative active material according to any one of embodiments 1 to 13.

Embodiment 15. The method according to embodiment 14, wherein in step (1), a ratio of the mass of the polymer to the volume of the solvent is from 0.1 g/L to 10 g/L, optionally from 1 g/L to 5 g /L.

Embodiment 16. The method according to embodiment 14 or 15, wherein the mass ratio of the SiO$_x$ particles in step (2) to the polymer in step (1) is from 10 to 200, and optionally from 20 to 100.

Embodiment 17. The method according to any one of embodiments 14-16, wherein the ratio of the mass of the sulfur powder to the mass of the polymer is (1~5):1, optionally (2~4): 1.

Embodiment 18. The method according to any one of embodiments 14-17, wherein the heat-treatment temperature is from 250° C. to 450° C., optionally from 300° C. to 450° C., or from 380° C. to 430° C.

Embodiment 19. The method according to any one of embodiments 14-18, wherein the heat treatment time is for 2-8 hours, optionally 3-5 hours.

Embodiment 20. A secondary battery comprising the negative active material according to any one of embodiments 1-13 or the negative active material obtained by the method according to any one of embodiments 14-19.

Embodiment 21. A battery module, comprising the secondary battery according to embodiment 20.

Embodiment 22. A battery pack comprising the battery module according to embodiment 21.

Embodiment 23. An apparatus comprising at least one of the secondary battery according to embodiment 20, the battery module according to embodiment 21, or the battery pack according to embodiment 22.

Example 1

(1) Preparation of Negative Active Material

① 0.7 g of polyacrylonitrile (PAN) (weight-average molecular weight of 50,000 to 150,000 with a molecular weight distribution coefficient of 1.2 to 1.5) was dispersed into a solvent of 1 L of dimethylformamide, and stirred until that all the polyacrylonitrile was dissolved, to obtain a solution.

② 100 g of silicon monooxide (SiO, particle size of 1.5 μm~11 μm) was added to the above solution and stired to obtain a mixed slurry;

③ The mixed slurry was heated and dried in an argon atmosphere at 180° C. for 2 hours to obtain a solid powder;

④ 1.4 g of sulfur powder (purity>99.9%) was weighted and mixed with the above solid powder, heat-treated at 380° C. for 3 h in an argon atmosphere. After cooling the negative active material was obtained.

(2) Preparation of Button Battery

The negative active material prepared above and artificial graphite were mixed in a mass ratio of 3:7 to obtain a negative active substance. The resulting negative active substance, a conductive agent Super-P (conductive carbon black), a binder styrene-butadiene rubber (SBR) and sodium carboxymethyl cellulose (CMC-Na) were mixed and stirred at a mass ratio of 88:3:6:3 in an appropriate amount of deionized water to obtain a homogeneous negative electrode slurry; the negative electrode slurry was coated on the surface of the negative electrode current collector copper foil, following by drying, cold pressing and cutting, thereby obtaining a negative electrode plate, which can be used as a negative electrode plate of a secondary battery.

A lithium metal plate was used as an electrode, a PP film (Celgard 2400) was used as a separator, and an electrolytic solution was injected to assemble a button battery. In the electrolytic solution, ethylene carbonate (EC), ethyl methyl carbonate (EMC), and diethyl carbonate (DEC) were mixed uniformly in a volume ratio of 1:1:1 to obtain an organic solvent, and then $LiPF_6$ was dissolved in the above organic solvent. Then the additive fluoroethylene carbonate (FEC) was add, where the concentration of $LiPF_6$ was 1 mol/L, and the mass ratio of FEC in the electrolyte was 6%.

Examples 2 to 13

The negative active material was prepared using the parameters of Examples 2-13 (Ex 2-13) in Table 1. The SiO particle size used in Example 10 was from 2 to 3.5 μm, the SiO particle size used in Example 11 was from 7 to 9 μm, and the SiO particles used in Example 12 was from 2 to 2.5 μm, the SiO particle size used in Example 13 was from 4 to 5 μm, and the rest was the same as that of Example 1, and the preparation of the button battery was the same as that of Example 1.

diameter was 1.2 μm, and the power was 1 mW; macro Raman test mode was used and a CCD detector was used. The negative active material powder was pressed into a tablet, 3 points were randomly selected on the tablet for testing, and the average value was taken. The Raman spectrum of a negative electrode active material in the example was shown in FIG. 1.

The intensity of the scattering peak at the Raman shift of 280 $cm^{-1}$ to 345 $cm^{-1}$ was recorded as $I_1$; the intensity of the scattering peak at the Raman shift of 450 $cm^{-1}$ to 530 $cm^{-1}$ was recorded as $I_2$; the intensity of the scattering peak at the position of 900 $cm^{-1}$ to 960 $cm^{-1}$ was recorded as $I_3$; the intensity of the scattering peak at the position of Raman shift of 1300 $cm^{-1}$ to 1380 $cm^{-1}$ was recorded as $I_D$; the intensity of the scattering peak at the position of Raman shift of 1520 $cm^{-1}$ to 1590 $cm^{-1}$ was recorded as $I_G$. The results are shown in Table 2.

2) XRD Spectrum Analysis

Figure 2:
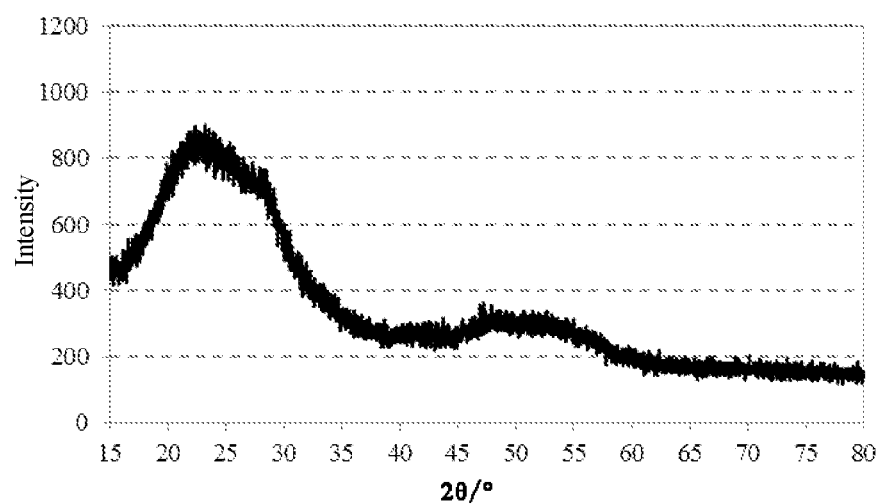
FIG. 2 is an X-ray diffraction (XRD) diagram of a negative active material according to the present application.

A Bruker D8 Discover X-ray diffractometer was used to test the negative electrode active material obtained from each of the examples and comparative examples, in which $CuK_\alpha$ rays was used as the radiation source, the ray wavenumber was λ=1.5406 Å, the scanning angle range for 2θ was from 15° to 80°, and the scanning rate was 4°/min. The XRD spectrum of a negative electrode active material in the example was shown in FIG. 2.

TABLE 1

Relevant preparation parameters for the negative active material

| | | $SiO_x$ in step② | Polymer in step① | | Solvent in step① | | Mass of sulfur powder in step ④ | Drying in step ③ | | Heat-treatment in step④ | |
|---|---|---|---|---|---|---|---|---|---|---|---|
| | No. | X | Name | Mass (g) | Name | Volume (L) | (g) | Temp. (° C.) | Time (h) | Temp. (° C.) | Time (h) |
| Ex | 1 | 1 | 100 | PAN | 0.7 | DMF | 1 | 1.4 | 180 | 2 | 380 | 3 |
| | 2 | 1 | 100 | PAN | 1 | DMF | 1 | 2 | 180 | 2 | 380 | 3 |
| | 3 | 1 | 100 | PAN | 1.5 | DMF | 1 | 2 | 185 | 2 | 400 | 2 |
| | 4 | 1 | 100 | PAN | 2.5 | DMF | 1 | 4 | 200 | 2 | 400 | 3 |
| | 5 | 1 | 100 | PAN | 3 | DMF | 1 | 6 | 190 | 2 | 430 | 2 |
| | 6 | 1 | 100 | PAN | 3.5 | DMF | 1 | 7 | 190 | 2 | 430 | 2.5 |
| | 7 | 1 | 100 | PAN | 4 | DMF | 1 | 8 | 190 | 2 | 430 | 3 |
| | 8 | 1 | 100 | PAN | 5.5 | DMF | 1 | 11 | 190 | 2 | 450 | 3 |
| | 9 | 1 | 100 | PAN | 6.5 | DMF | 1 | 13 | 190 | 2 | 450 | 4 |
| | 10 | 1 | 100 | PANI | 3 | NMP | 1 | 9 | 190 | 2 | 450 | 3.5 |
| | 11 | 1 | 100 | PANI | 3 | NMP | 1 | 9 | 190 | 2 | 450 | 3.5 |
| | 12 | 1 | 100 | PE | 3 | DMB | 1 | 12 | 175 | 2 | 350 | 5 |
| | 13 | 1 | 100 | PE | 3 | DMB | 1 | 12 | 175 | 2 | 350 | 5 |
| CE | 1 | 1 | 100 | PAN | 3.5 | DMF | 1 | 0 | 190 | 2 | / | / |
| | 2 | 1 | 100 | PAN | 3.5 | DMF | 1 | 0 | 190 | 2 | 1200 | 3 |
| | 3 | 1 | 100 | PAN | 0.4 | DMF | 1 | 0.8 | 190 | 2 | 450 | 3 |
| | 4 | 1 | 100 | PAN | 9 | DMF | 1 | 18 | 190 | 2 | 450 | 3 |

Comparative Examples 1 to 4

The negative active material was prepared using the parameters of Comparative Examples 1 to 4 (CE 1-4) in Table 1, and the rest was the same as in Example 1. The preparation of the button battery was the same as that of Example 1.

Test of Negative Active Material

1) Raman Spectroscopy Analysis

A LabRAM HR Evolution laser microscopic Raman spectrometer was used to determine the negative electrode active material obtained from each of the examples and comparative examples, in which a solid-state laser with a wavelength of 523 nm was used as the light source, the beam 3) Detection of Specific Surface Area and Particle Size The specific surface area of the negative active materials of the examples and comparative examples was measured with nitrogen adsorption specific surface area analysis with reference to GB/T 19587-2004 (Determination of the specific surface area of solids by gas adsorption using the BET method), and calculated by the BET (Brunauer Emmett Teller) method, in which the nitrogen adsorption specific surface area analysis can be carried out by a specific surface and pore size distribution analyzer of Type: Tri Star II 3020 from Micromeritics, USA.

The particle size $D_v10$, $D_v50$, and $D_v90$ of the negative active materials 1-12, A-E were measured by the Mastersizer3000 laser particle size analyzer from Malvern Instruments Co., Ltd., and the particle size distribution was calculated according to the following formula.

Particle size distribution=$(D_v 90 - D_v 10)/D_v 50$

The results were shown in Table 2.

4) Initial Coulombic Efficiency and Cycle Performance Test

Under a normal pressure environment at 25° C., a button battery was discharged at a constant current rate of 0.1 C to 0.005V, and then discharged at a constant current rate of 0.05 C to 0.005V. The resulting discharge specific capacity was recorded as the lithiation capacity at the first cycle. After that, the battery was charged to 1.5V at a constant current rate of 0.1 C. The resulting charge specific capacity was recorded as the delithiation capacity at the first cycle. The button battery was subjected to 50 charge and discharge cycles following the procedure described above, and the delithiation capacity was recorded for each cycle.

The initial coulombic efficiency of the negative active material (%)=the delithiation capacity at the first cycle/the lithiation capacity at the first cycler 100%

Cycle capacity retention rate of the negative active material (%)=the delithiation capacity at the 50$^{th}$ cycle/the lithiation capacity at the first cycler×100%.

The results were shown in Table 2.

TABLE 2

Test results

| No. | | $I_1/I_2$ | $I_3/I_2$ | $I_D/I_G$ | $D_v 50$ (μm) | Particle size distribution | Specific surface area (m$^2$/g) | Initial coulombic efficiency (%) | Cycle capacity retention rate (%) |
|---|---|---|---|---|---|---|---|---|---|
| Example | 1 | 0.12 | 0.24 | 1.05 | 5.9 | 1.38 | 2.71 | 77.9 | 92.0 |
| | 2 | 0.14 | 0.28 | 1.07 | 5.9 | 1.39 | 2.71 | 78.9 | 92.1 |
| | 3 | 0.18 | 0.32 | 1.12 | 6.0 | 1.26 | 2.70 | 81.1 | 94.4 |
| | 4 | 0.20 | 0.45 | 1.20 | 5.9 | 1.48 | 2.71 | 81.7 | 96.0 |
| | 5 | 0.25 | 0.51 | 1.25 | 6.1 | 1.21 | 2.69 | 81.9 | 96.8 |
| | 6 | 0.27 | 0.60 | 1.30 | 6.1 | 1.20 | 2.69 | 82.8 | 97.1 |
| | 7 | 0.32 | 0.75 | 1.39 | 6.2 | 1.18 | 2.67 | 80.5 | 94.2 |
| | 8 | 0.38 | 0.79 | 1.45 | 6.3 | 1.16 | 2.68 | 80.2 | 93.8 |
| | 9 | 0.48 | 0.95 | 1.50 | 6.4 | 1.02 | 2.68 | 79.6 | 93.5 |
| | 10 | 0.56 | 0.48 | 1.06 | 4 | 1.97 | 3.16 | 79.1 | 91.8 |
| | 11 | 0.52 | 0.66 | 1.32 | 9.7 | 0.76 | 1.07 | 79.6 | 93.3 |
| | 12 | 0.57 | 0.39 | 1.30 | 2.7 | 2.21 | 4.98 | 78.3 | 92.2 |
| | 13 | 0.50 | 0.57 | 1.28 | 5.9 | 1.37 | 2.57 | 80.5 | 93.6 |
| Comparative example | 1 | / | / | / | 6.0 | 1.20 | 2.67 | 71.9 | 92.1 |
| | 2 | / | / | 1.27 | 6.1 | 1.22 | 2.70 | 72.5 | 91.8 |
| | 3 | 0.27 | 0.13 | 1.15 | 5.9 | 1.35 | 2.70 | 70.7 | 89.1 |
| | 4 | 1.02 | 1.12 | 1.29 | 6.9 | 0.89 | 2.61 | 70.1 | 89.5 |

Note:
"/" means that the material does not have the scattering peak.

It can be seen from Table 2 that:
the negative active material of the present application comprises a silicon-oxygen compound and a coating layer coated on the outer surface of the silicon-oxygen compound. The negative active material of this application has scattering peaks at the Raman shifts of 280 cm$^{-1}$~345 cm$^{-1}$, 450 cm$^{-1}$~530 cm$^{-1}$, 900 cm$^{-1}$~960 cm$^{-1}$, in which $0.1 \leq I_1/I_2 \leq 0.6$, $0.2 \leq I_3/I_2 \leq 1.0$, making the negative active material of the present application have a higher initial coulombic efficiency and longer cycle life compared with the negative active materials of Comparative Examples 1 to 4; in particular, when satisfying $0.15 \leq I_1/I_2 \leq 0.4$ and $0.3 \leq I_3/I_2 \leq 0.8$, the initial coulombic efficiency and cycle life of the negative active material of the present application were further improved. It can be seen that the negative active material of the present application can improve the energy density, initial coulombic efficiency and cycle performance of the secondary battery.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A method for preparing a negative active material, comprising the following steps (1), (2), (3), optional step (2-1), and optional step (3-1):
   (1) dissolving a certain mass of a polymer in a solvent to obtain a solution; wherein the polymer is selected from at least one of polyacrylonitrile, polyaniline, polyethylene, polyacetylene, polyvinyl chloride and polystyrene;
   (2-1) crushing SiO$_x$ material to obtain SiO$_x$ particles with a certain particle size, in which 0<x<2;
   (2) mixing the SiO$_x$ particles with the solution obtained in step (1) to obtain a mixture, in which 0<x<2;
   (3-1) drying the mixture obtained in step (2) to obtain a solid;
   (3) mixing the mixture obtained in step (2) or the solid obtained in step (3-1) with a certain mass of sulfur powder, and then performing heat treatment in an inert atmosphere to obtain a negative active material.

2. The method according to claim 1, wherein in step (1), a ratio of the mass of the polymer to a volume of the solvent is from 0.1 g/L to 10 g/L, optionally from 1 g/L to 5 g /L.

3. The method according to claim 1, wherein a mass ratio of the SiOx particles in step (2) to the polymer in step (1) is from 10 to 200, and optionally from 20 to 100.

4. The method according to claim 1, wherein a ratio of the mass of the sulfur powder to the mass of the polymer is (1~5):1, optionally (2~4):1.

5. The method according to claim 1, wherein a heat-treatment temperature is from 250° C. to 450° C., optionally from 300° C. to 450° C., or from 380° C. to 430° C.

6. The method according to claim 1, wherein a heat treatment time is for 2-8 hours, optionally 3-5 hours.

7. A negative active material obtained by the method according to claim 1, wherein the negative active material comprises $SiO_x$ particles and a modified polymer coating layer covering the $SiO_x$ particles, in which $0<x<2$;

wherein the negative active material has a peak intensity $I_1$ at the Raman shift ranging from 280 $cm^{-1}$ to 345 $cm^{-1}$, a peak intensity $I_2$ at the Raman shift ranging from 450 $cm^{-1}$ to 530 $cm^{-1}$, and a peak intensity $I_3$ at the Raman shift ranging from 900 $cm^{-1}$ to 960 $cm^{-1}$, and $I_1$, $I_2$ and $I_3$ satisfy $0.1 \leq I_1/I_2 \leq 0.6$, and $0.2 \leq I_3/I_2 \leq 1.0$.

8. The negative active material according to claim 7, wherein $0.15 \leq I_1/I_2 \leq 0.4$.

9. The negative active material according to claim 7, wherein $0.3 \leq I_3/I_2 \leq 0.8$.

10. The negative active material according to claim 7, wherein the negative active material has a peak intensity $I_D$ at the Raman shift ranging from 1300 $cm^{-1}$ to 1380 $cm^{-1}$ and a peak intensity $I_G$ at the Raman shift ranging from 1520 $cm^{-1}$ to 1590 $cm^{-1}$, and the peak intensity $I_D$ and the peak intensity $I_G$ satisfy $1.05 \leq I_D/I_G \leq 1.50$; optionally, $1.1 \leq I_D/I_G \leq 1.45$.

11. The negative active material according to claim 7, wherein a full width at half maxima of the negative active material at the Raman shifts of 1300 $cm^{-1}$~1380 $cm^{-1}$ is from 120 $cm^{-1}$ to 160 $cm^{-1}$, optionally from 128 $cm^{-1}$ to 152 $cm^{-1}$.

12. The negative active material according to claim 7, wherein the modified polymer coating layer comprises sulfur element and carbon element.

13. The negative active material according to claim 12, wherein a mass percentage of the sulfur element is from 0.5% to 3% of the mass of the negative active material, optionally from 0.8% to 1.5%; and/or, a mass percentage of the carbon element is from 0.1% to 4% of the mass of the negative active material, optionally from 0.5% to 3%.

14. The negative active material according to claim 7, wherein the negative active material has an X-ray diffraction pattern comprising a diffraction peak at the diffraction angle 2θ of 19° to 27° and the diffraction peak has a full width at half maxima of 4° to 12°, and optionally 5° to 10°.

15. The negative active material according to claim 7, wherein the negative active material has a volume average particle diameter Dv50 of 2 μm-12 μm, optionally 4 μm-8 μm.

16. The negative active material according to claim 7, wherein the negative active material has a volume particle size distribution Dv10, a volume average particle size Dv50, and a volume particle size distribution Dv90 satisfying: $0.5 \leq (Dv90-Dv10)/Dv50 \leq 2.5$; optionally, $0.8 \leq (Dv90-Dv10)/Dv50 \leq 2.0$.

17. The negative active material according to claim 7, wherein the negative active material has a specific surface area of 0.5 $m^2/g$ to 5 $m^2/g$, optionally 0.8 $m^2/g$-3 $m^2/g$.

18. The negative active material according to claim 7, wherein the negative active material has a tap density of 0.8 $g/cm^3$ to 1.3 $g/cm^3$, optionally 0.9 $g/cm^3$ to 1.2 $g/cm^3$.

19. The negative active material according to claim 7, wherein the negative active material has a compacted density of 1.1 $g/cm^3$ to 1.6 $g/cm^3$ measured under a pressure of 5 tons (equivalent to 49 KN), optionally 1.2 $g/cm^3$ to 1.5 $g/cm^3$.

20. A secondary battery comprising the negative active material according to claim 7.

* * * * *